United States Patent [19]

DePuy

[11] 4,454,556
[45] Jun. 12, 1984

[54] TIMING CONTROLLER FOR A RECLOSER RELAY

[75] Inventor: Robert P. DePuy, Cherry Hill, N.J.

[73] Assignee: General Electric Company, King of Prussia, Pa.

[21] Appl. No.: 429,719

[22] Filed: Sep. 30, 1982

[51] Int. Cl.$^3$ .............................................. H02H 3/07
[52] U.S. Cl. ...................................... 361/73; 361/71; 307/141
[58] Field of Search ....................... 361/71, 72, 73, 74, 361/75, 59, 62, 63, 67, 61; 307/141

[56] References Cited

U.S. PATENT DOCUMENTS

| | | | |
|---|---|---|---|
| 2,582,027 | 1/1952 | Goff, Jr. ................................ | 361/73 |
| 2,909,707 | 10/1959 | Derr et al. ............................ | 361/72 |
| 3,381,177 | 4/1968 | Allen .................................... | 361/72 |
| 3,416,035 | 12/1968 | Lipnitz ................................. | 361/73 |
| 3,440,491 | 4/1969 | Tenenbaum et al. ................. | 361/73 |
| 3,471,749 | 10/1969 | Harris ................................... | 361/59 |
| 3,801,872 | 4/1974 | Zocholl et al. ....................... | 361/73 |

Primary Examiner—Patrick R. Salce
Attorney, Agent, or Firm—William Freedman

[57] ABSTRACT

A timing controller which supervises the reclosure of a fault responsive circuit breaker which includes a plurality of selectable switches for developing signals representing the reset and reclose delay times for the recloser relay operatively associated with the fault responsive circuit breaker; a plurality of multiplexers for receiving the signals developed by the selectable switches and for developing serially formatted digital words in accordance with such signals for delivery to an output controlling multiplexer; a first counter assembly for regulating the output of the output controlling multiplexer in accordance with the condition of the recloser relay; a storage device for receiving and storing the output of the output controlling multiplexer; and a comparison device for comparing the stored output of the output controlling multiplexer with a second counter assembly which develops a timed output signal. Successful comparison of these signals produces an output signal for supervising the operation of the recloser relay.

17 Claims, 5 Drawing Figures

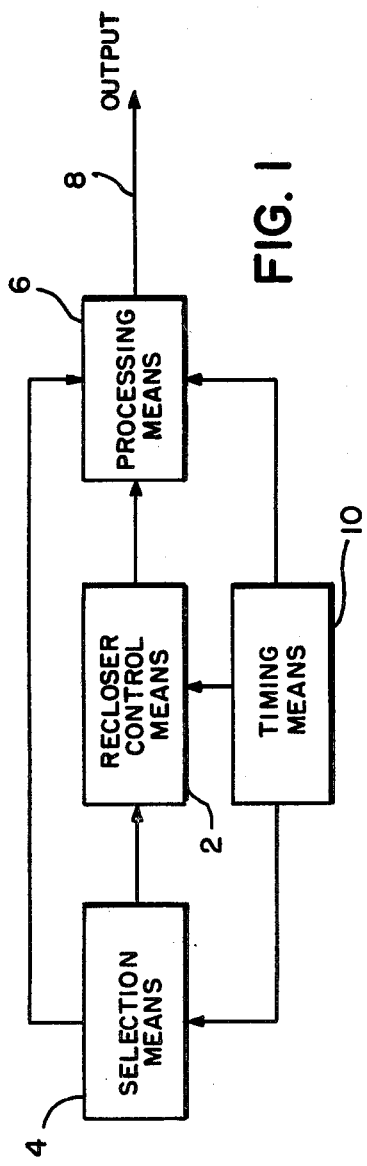

| RECLOSER RELAY CONDITION | COUNTER (1) | | | | | | MUX-5 | | | MUX-1,2,3,4 | | OVER-RIDE |
|---|---|---|---|---|---|---|---|---|---|---|---|---|
| | INPUT | | OUTPUT | | | | | | SELECTED INPUTS | TIMER SELECTED | | |
| | RESET | AFTER CK* | $Q_3$ | $Q_2$ | $Q_1$ | | B | A | | | | |
| INITIAL STATE (AFTER RESET) | 0 | - | 0 | 0 | 0 | | 0 | 0 | $X_0$ | RESET TIMER | | 1 |
| FIRST TIMED RECLOSE | 0 | 1 | 0 | 0 | 1 | | 0 | 1 | $X_1$ | RECLOSE TIMER 1 | | 1 |
| SECOND TIMED RECLOSE | 0 | 2 | 0 | 1 | 0 | | 1 | 0 | $X_2$ | RECLOSE TIMER 2 | | 1 |
| THIRD TIMED RECLOSE | 0 | 3 | 0 | 1 | 1 | | 1 | 1 | $X_3$ | RECLOSE TIMER 3 | | 1 |
| LOCKOUT STATE | 0 | 4 | 1 | 0 | 0 | | 0 | 0 | $X_0$ | RESET TIMER | | 1 |
| RESET STATE | 1 | - | 0 | 0 | 0 | | 0 | 0 | $X_0$ | RESET TIMER | | 1 |
| OVERRIDE STATE | X | - | X | X | X | | 0 | 0 | $X_0$ | RESET TIMER | | 0 |

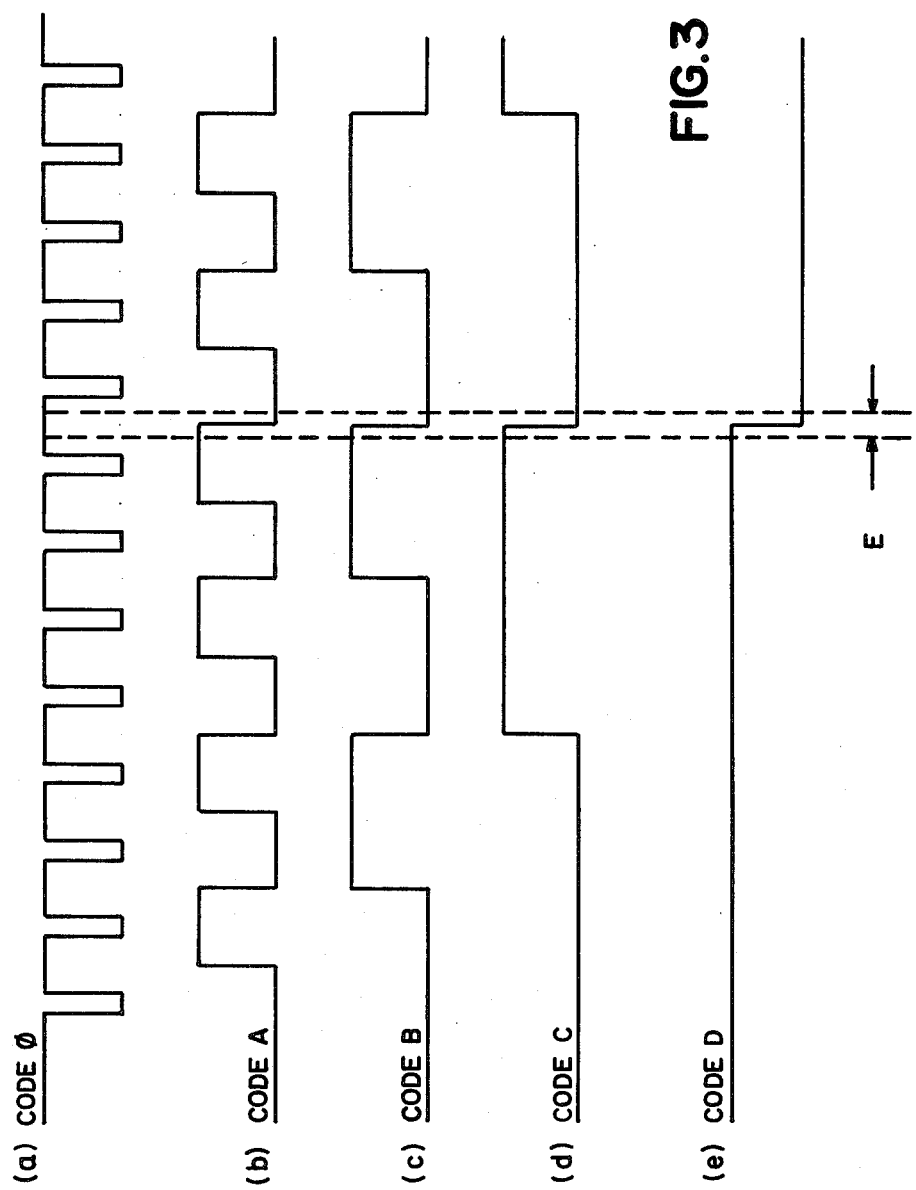

TIMING CONTROLLER FOR A RECLOSER RELAY

BACKGROUND OF THE INVENTION

The present invention relates generally to recloser relays, and more particularly, to a controller for supervising the operation of a recloser relay.

Power circuit breakers are typically provided as a means for interconnecting or isolating portions of a transmission line. Such power circuit breakers are typically controlled by a monitoring system which, upon detection of an abnormal condition, commands the power circuit breaker to be appropriately opened or decoupled from the transmission line (tripped). Preferably, the power circuit breaker will remain in its open position until the abnormal condition is corrected or dissipates itself.

Typically, the dissipation of abnormal conditions is variable in nature. It is therefore generally desired that reclosure of the fault responsive circuit breaker be adaptable to the various types of fault conditions which may be encountered in a particular application. For example, in some applications it may be desired to issue a reclosure command to the circuit breaker without an intentional delay after the circuit breaker has been tripped. Such so called "instantaneous" reclosures would, of course, be subject to the inherent delays caused in operating the various components which are used to reclose the fault responsive circuit breaker. In other applications it may be desired to intentionally delay such reclosure commands in order to permit time for the fault condition to dissipate. Often, it is desired to provide combinations of these commands to develop a progression of attempted reclosures which are timed to accommodate the various fault conditions which may arise in conjunction with the particular application involved.

To provide such capabilities, the recloser relays which are used to cause reclosure of the fault responsive circuit breaker are generally provided with the capability of performing a series of reclosure functions, the first generally being an instantaneous reclosure and the remaining reclosures generally incorporating progressively increasing time delays. In operation, such recloser relays would generally first attempt an instantaneous reclosure upon sensing a fault condition. If the reclosed circuit breaker remains closed for a prescribed reset period, a successful reclosure is deemed accomplished. If not, the recloser relay progresses through subsequent, delayed recloses in similar manner until either a successful reclose occurs or until the resulting reclose cycle is unsuccessfully completed, indicating a lockout condition and the need for manual intervention.

Typically, the timing of such a reclose cycle is regulated by a rotating cam shaft which operates in conjunction with associated, mechanically operated switches. Examples of such systems may be found in U.S. Pat. No. 3,381,177, issued to W. P. Allen, and U.S. Pat. Nos. 3,333,154 and 2,582,027, issued to L. E. Goff, Jr. Although providing adequate results in many applications, such mechanical systems present several limitations in their use, primarily due to the inherent limitations of the mechanically operated components comprising such systems. This often limits the ability of an operater to select when various reclosures are to occur with respect to a sensed fault, as well as to select the time delays associated with each attempted reclose and the reset time needed to safely assure that an attempted reclose has been successful. It is therefore desirable to perform the foregoing functions electronically, to remove such mechanical dependencies from the reclose cycle and to provide the reclose cycle with increased versatility.

Accordingly, it is a primary object of the present invention to provide a versatile means for monitoring and supervising the reclosing of a fault responsive circuit breaker so as to accommodate various fault conditions related to the associated transmission line.

It is a further object of the present invention to provide means for easily setting and varying the parameters of the reclose cycle which regulates the operation of a recloser relay associated with a fault responsive circuit breaker, to accommodate a variety of potential faults arising in conjunction with a transmission line.

It is a still further object of the present invention to provide an electronically derived means for regulating the operation of a recloser relay, to provide increased facility and versatility in setting and varying the parameters of the resulting reclose cycle.

It is a still further object of the present invention to provide an electronically derived means for regulating the operation of a recloser relay associated with a fault responsive circuit breaker which uses a limited amount of electronic devices to provide a simple, reliable, yet economical device.

These and still further objects will become apparent from the following description.

SUMMARY OF THE INVENTION

In accordance with the present invention, a circuit arrangement is provided which compares presettable parameters representative of the desired reset and reclose times which are to comprise the reclose cycle pertaining to a particular fault responsive circuit breaker, with the sensed condition of the recloser relay associated with the fault responsive circuit breaker.

A preferred embodiment circuit arrangement capable of providing this capability generally includes:

(a) selectable means for selecting the limits representative of the desired reset and reclose times to comprise the reclose cycle which is to regulate operation of the recloser relay associated with the circuit breaker, and for providing digital signals representative of the selected limits;

(b) first counter means responsive to the condition of the recloser relay associated with the circuit breaker;

(c) sequential means for accepting the digital signals representative of the selected limits of the reclose cycle and for selectively providing a first digital output signal, representative of one of the accepted digital signals, in response to the condition of the first counter means;

(d) storage means for accepting the first digital output signal from the sequential means and for selectively providing a second digital output signal representative of the stored, first digital output signal;

(e) second counter means, responsive to a clock signal, for providing a digital output signal representative of the counted contents of the second counter means, thereby developing a timed, counting signal;

(f) comparison means for comparing the second digital output signal of the storage means with the digital output signal of the counter means, and for generating an intermediate output signal when the second digital output signal of the storage means equals the digital output signal of the counter means; and (g) means responsive to the intermediate output signal of the comparision means for generating an output signal used in generating reclosure commands for operating the recloser relay associated with the fault responsive circuit breaker.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

BRIEF DESCRIPTION OF THE DRAWINGS

FIG. 1 is a block diagram showing the circuit arrangement of the present invention.

FIG. 3 is a timing diagram showing the timing signals which control the circuit arrangements of FIGS. 2A and 2B.

FIG. 4 is a matrix showing the interrelationship between the selected limits of the reclose cycle, the condition of the recloser relay and the circuit arrangement of the present invention.

In the several illustrations provided, like reference numerals denote similar structure.

DETAILED DESCRIPTION OF THE PREFERRED EMBODIMENT

Figure 2A:
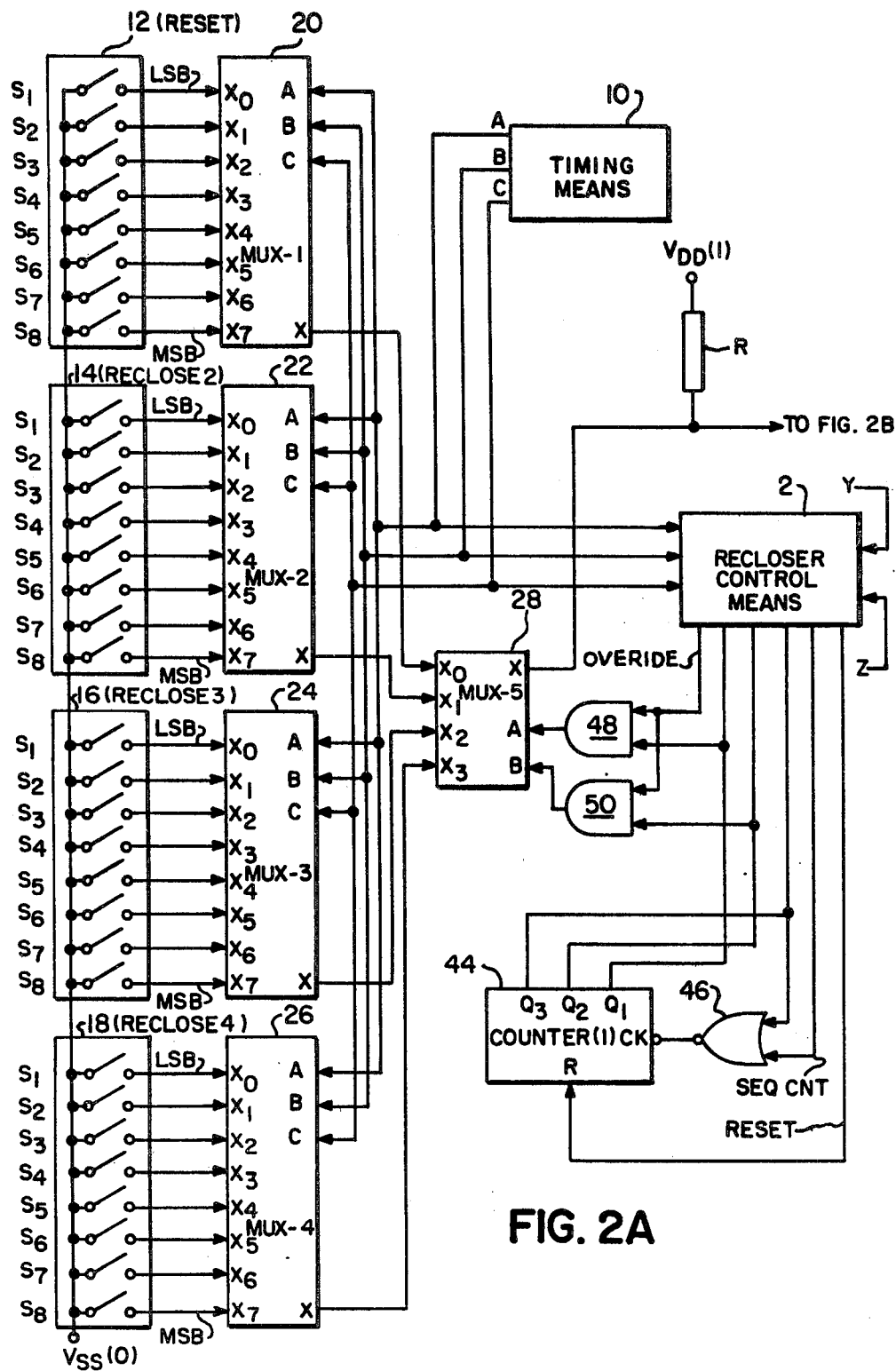
FIG. 2A is a logic diagram of the means used to select limits representative of the reset and reclose times which are to comprise the reclose cycle.

FIG. 1 shows a block diagram of a preferred embodiment circuit arrangement 1 in accordance with the present invention which generally comprises: recloser control means 2 which monitors the condition of the recloser relay (not shown) associated with the fault responsive circuit breaker (not shown) and which provides signals representative of the condition of the recloser relay; selection means 4 for presetting the limits representative of the reset and reclose times which are to comprise the reclose cycle which will regulate the operation of the recloser relay, and for selecting which of these limits are to be processed in accordance with the condition of the recloser relay; processing means 6 for receiving the selected limits from the selection means 4 and for developing an output 8 for operating the recloser relay in accordance with the selected limits; and timing means 10 for appropriately synchronizing the operation of the selection means 4, the recloser control means 2 and the processing means 6.

Figure 2B:
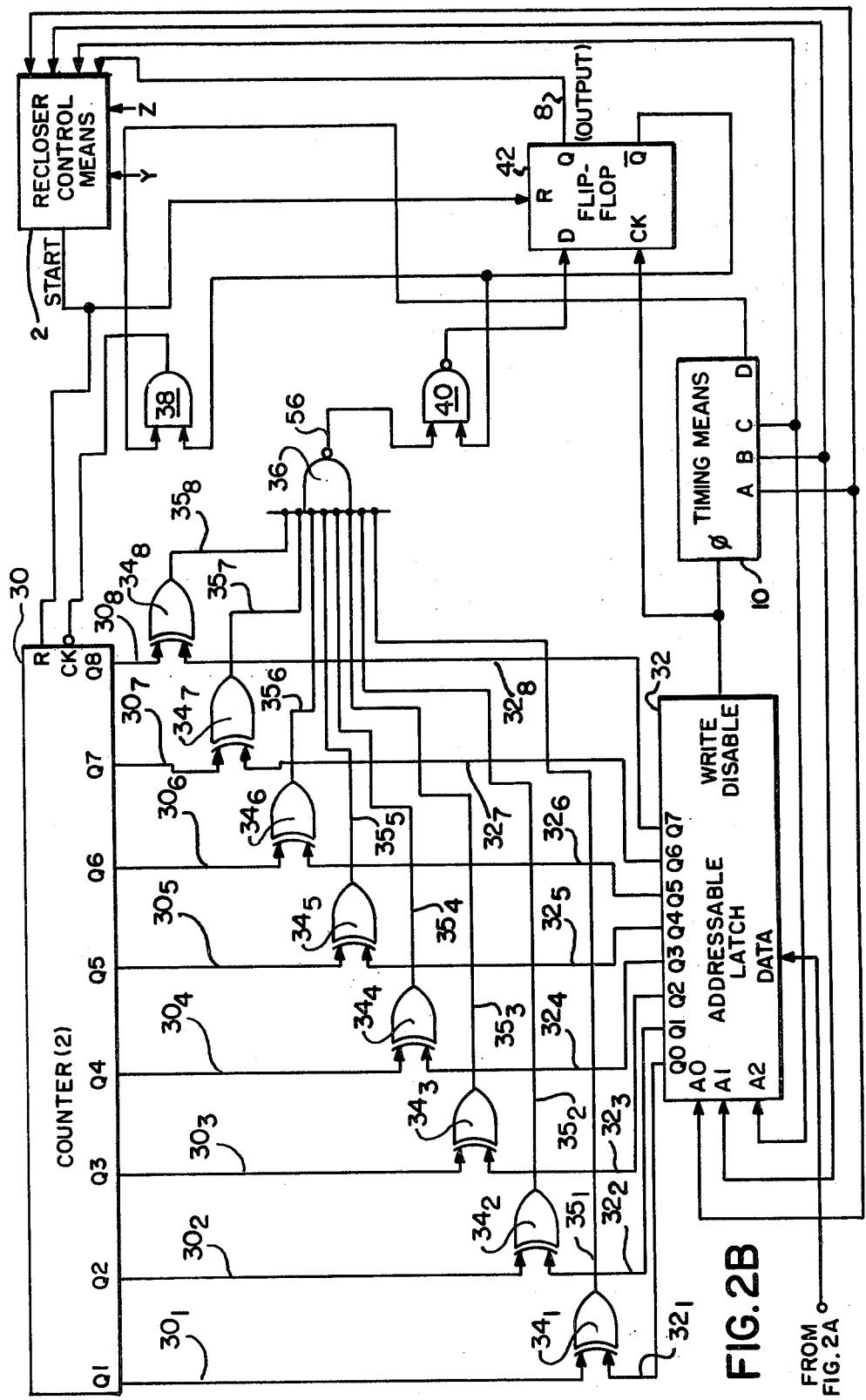
FIG. 2B is a logic diagram of the means used to receive the selected limits and to generate an output for operating the recloser relay in accordance with the selected reclose cycle.

The recloser control means 2 is associated with the recloser relay and monitors the condition of the recloser relay as it progresses through a reclose cycle. The recloser control means 2 is also used to generate signals representative of this sensed condition. One component which may be used to develop the function of the recloser control means 2 is the Modular Reclosing Relay Model No. DAR 100, manufactured by S. A. Construcciones Electricas De Proteccion, Av. Pinoa 10, Zamudio (Bilbao), P.O. Box 732, Bilbao, Spain. In order to adapt such a component to operate in conjunction with the circuit arrangement of the present invention, various timing signals which are to be more fully described in conjunction with the circuit arrangement illustrated in FIGS. 2A and 2B are also routed to the recloser control means 2, as shown, to provide the recloser control means 2 with information indicating where the system stands in the reclose cycle. The recloser control means 2 is also capable of monitoring the breaker auxiliary contact Y for an indication of the status of the circuit breaker, and the breaker control switch Z for an indication of a manual close signal to the circuit breaker. These various signals serve as inputs to the recloser control means 2, to produce the following four signals for use in conjunction with the selection means 4 and the processing means 6, including:

(1) SEQ CNT—a sequence control signal which is produced each time the reclose cycle is to advance to the next reclose;

(2) START—a start signal which is produced to indicate the beginning of a selected time period;

(3) OVERRIDE—an override signal which is produce when a reclose is attempted, establishing the need for a relay reset period;

(4) RESET—a reset signal which is produced to indicate that a successful reclose has been achieved.

For further details regarding the construction and operation of such recloser control means, reference is also made to U.S. Pat. Nos. 3,381,177; 3,333,154; and 2,582,027, previously referred to. It will be understood that the construction and operation of such recloser control means do not form part of the present invention, but that such devices may be used to develop a variety of signals pertaining to the reclose cycle.

Generally, recloser relays will produce up to four reclose signals, a first instantaneous reclose which occurs without intentional delay after the associated circuit breaker has been tripped, and three subsequent delayed reclosures. Since recloser relays are used in a variety of different applications, it is preferable for the operator to be provided with an ability to vary the reclose cycle. Selection of which of the available reclosures are to be used may be accomplished by advancing past unwanted reclosures through the recloser control means 2. Selection of the reset time for each selected reclose, and the delay times for any delayed reclosures selected, may be accomplished in a manner which will be fully described below.

The timing means 10 generates five timing code signals represented by the references $\phi$, A, B, C and D, respectively. In its preferred embodiment, the timing means 10 develops these signals at the following repetition rates: Signal $\phi$—16,384 Hz; Signal A—8,192 Hz; Signal B—4,096 Hz; Signal C—2,048 Hz; and Signal D—1 or 10 Hz. Moreover, as will be discussed more fully below, signal $\phi$ will be shifted in phase from Signals A, B, C and D. It will be understood that a variety of known, available circuit arrangements and circuit components may be used to derive such timing signals, and accordingly, that the circuits and components used to derive the foregoing signals also do not form part of the present invention. However, the foregoing signals may be combined to provide timing functions which regulate operation of the selection means 4, the recloser control means 2 and processing means 6 in a manner which will be more fully described below.

FIG. 2A illustrates the circuit arrangement of the selection means 4 in greater detail. As shown, a series of switch modules 12, 14, 16, 18 are provided which incorporate a plurality of individually settable switches $S_1$, $S_2$, $S_3$, $S_4$, $S_5$, $S_6$, $S_7$, $S_8$. The modules 12, 14, 16, 18 are respectively connected to the $X_0$, $X_1$, $X_2$, $X_3$, $X_4$, $X_5$, $X_6$, $X_7$ inputs associated with multiplexers 20, 22, 24, 26 (designated as MUX-1, MUX-2, MUX-3 and MUX-4, respectively). A variety of available components may be used to develop these functions, such as the eight position DIP switch No. 76PSB08, available from Greyhill, Inc., 561 Hillgrove Ave., LeGrange, Ill., 60525, which may be used as the modules 12, 14, 16, 18, and CMOS Part Type 4051, available from RCA Solid State Division, Route 202, Somerville, N.J. 08876, which may be used as the multiplexers 20, 22, 24, 26.

The common arms of the switches $S_1$, $S_2$, $S_3$, $S_4$, $S_5$, $S_6$, $S_7$ and $S_8$ of modules 12, 14, 16, 18 are each connected to a voltage source $V_{SS}(0)$, which provides a voltage level representative of a logic "zero". Accordingly, the closure of any of the switches $S_1$, $S_2$, $S_3$, $S_4$, $S_5$, $S_6$, $S_7$, $S_8$ represents a logic zero when applied to its associated multiplexer input. In this manner, each of the switches 12, 14, 16, 18 are used to provide a parallel formatted eight (8) bit word to each of the multiplexers 20, 22, 24, 26, respectively. Since the switches $S_1$, $S_2$, $S_3$, $S_4$, $S_5$, $S_6$, $S_7$, $S_8$ of each module 12, 14, 16, 18 are respectively routed to the $X_0$, $X_1$, $X_2$, $X_3$, $X_4$, $X_5$, $X_6$, $X_7$ inputs of MUX-1, MUX-2, MUX-3 and MUX-4, it will be understood that the closure of switches $S_1$, $S_2$, $S_3$, $S_4$, $S_5$, $S_6$, $S_7$, $S_8$ will respectively supply the least significant bit (LSB-the $2^0$ bit) through the most significant bit (MSB-the $2^7$ bit) of four eight bit words to the associated multiplexers 20, 22, 24, 26. As will be described more fully hereinafter, these eight bit words respectively provide the preselectable limits used in developing the reset, reclose 1, reclose 2, and reclose 3 times which are to comprise the reclose cycle of the recloser relay, in accordance with the signals received from the recloser control means 2 previously described.

The multiplexers 20 (MUX-1), 22 (MUX-2), 24 (MUX-3) and 26 (MUX-4) respectively accept the parallel formatted eight bit words selected via the modules 12, 14, 16, 18 at their inputs $X_0$, $X_1$, $X_2$, $X_3$, $X_4$, $X_5$, $X_6$, $X_7$ and convert each parallel formatted eight bit word into serial eight (8) bit words which are presented at the respective output X of each multiplexer 20, 22, 24, 26 in accordance with the timing signals A, B and C generated by the timing means 10 as previously described.

The X output of each of the multiplexers 20, 22, 24, 26 is in turn respectively applied as shown to the $X_0$, $X_1$, $X_2$ and $X_3$ inputs of the multiplexer 28 (designated as MUX-5), which may be a CMOS Part Type 4052, available from RCA Solid State Division, Route 202, Somerville, N.J. 08876, for example. The multiplexer 28 (MUX-5) selects between the four serial eight bit words received from the X outputs of MUX-1, MUX-2, MUX-3, and MUX-4, respectively, in accordance with timing signals (designated as A and B) which are generated by Counter (1) 44 to produce the output X of the multiplexer 28, and accordingly, the selection means 4.

Counter (1) 44 receives its clock (CK) input from a two input NOR circuit 46, and develops three output signals $Q_1$, $Q_2$ and $Q_3$. One of the two inputs to NOR circuit 46 is coupled to the SEQ CNT signal output of the recloser control means 2, and the $Q_3$ output of Counter (1) 44 is routed to the second input of NOR circuit 46. The $Q_1$, $Q_2$ and $Q_3$ outputs are also each routed to the recloser control means 2. The reset (R) input of Counter (1) 44 is coupled to the RESET signal output of the recloser control means 2.

The $Q_1$ output of Counter (1) 44 is routed to one input of a two input AND circuit 48, and the $Q_2$ output of Counter (1) 44 is routed to one input of a two input AND circuit 50. The remaining inputs of the AND circuits 48, 50 are connected together and are coupled to the OVERRIDE signal output of the recloser control means 2.

The output of the selection means 4 is routed to the processing means 6, the circuit arrangement of which is illustrated in greater detail in FIG. 2B. Accordingly, each accepted serial eight bit word developed at the X output of multiplexer 28, as determined by the state of the Counter (1) 44, is routed to the Data input of an eight (8) bit Addressable Latch 32. The acceptance of data by the Addressable Latch 32 is regulated in a prescribed sequential manner in accordance with the timing signals A, B and C generated by the timing means 10, which timing signals are coupled to the timing inputs $A_0$, $A_1$, $A_2$ of Addressable Latch 32. Since the timing signals A, B and C also regulate the sequencing of data within the selection means 4, it will be understood that the input of data to the Addressable Latch 32 will be synchronized to the selection of data by the multiplexers 20, 22, 24, 26, 28. Lastly, the Addressable Latch 32 includes a WRITE DISABLE input which is coupled to the $\phi$ output signal of the timing means 10. The function of the Addressable Latch 32 may be developed using CMOS Part Type 4099, available from RCA Solid State Division, Route 202, Somerville, N.J. 08876, for example.

The connection between the output X of multiplexer 28 and the input of Addressable Latch 32 is also routed via resistor R to $V_{DD}(1)$, which serves as a means to pull the input to the Addressable Latch 32 up to $V_{DD}(1)$ when the switches associated with modules 12, 14, 16, 18 are not closed and connected to $V_{SS}(0)$, thereby developing a logic "one" in such cases.

Addressable Latch 32 provides an eight bit digital word, via its output terminals Q0, Q1, Q2, Q3, Q4, Q5, Q6 and Q7, in a sequential manner in accordance with the timing signals A, B, and C. The outputs $Q_0$, $Q_1$, $Q_2$, $Q_3$, $Q_4$, $Q_5$, $Q_6$ and $Q_7$ of Addressable Latch 32, via paths $32_1$, $32_2$, $32_3$, $32_4$, $32_5$, $32_6$, $32_7$ and $32_8$, are respectively routed to a first input of Exclusive OR Circuits $34_1$, $34_2$, $34_3$, $34_4$, $34_5$, $34_6$, $34_7$ and $34_8$.

The second input of Exclusive OR Circuits $34_1$, $34_2$, $34_3$, $34_4$, $34_5$, $34_6$, $34_7$ and $34_8$ are each respectively connected to the Q1, Q2, Q3, Q4, Q5, Q6, Q7 and Q8 outputs of Counter (2) 30. Counter (2) 30 further includes a reset (R) input which is coupled to the START signal output of the recloser control means 2, and a clock (CK) input which is coupled to the output of a two input AND circuit 38, one input of which is coupled to the timing signal D output of the timing means 10. The clocking and resetting of Counter (2) 30 which results from these connections will be more fully described hereinafter with reference to FIGS. 3 and 4.

Each of the outputs $35_1$, $35_2$, $35_3$, $35_4$, $35_5$, $35_6$, $35_7$ and $35_8$ of Exclusive OR Circuits $34_1$, $34_2$, $34_3$, $34_4$, $34_5$, $34_6$, $34_7$ and $34_8$ are routed to one of the inputs of an eight input NAND Circuit 36. Accordingly, when the digital contents of Counter (2) 30, represented by the digital value of the signals present on data paths $30_1$, $30_2$, $30_3$, $30_4$, $30_5$, $30_6$, $30_7$ and $30_8$, attain the same value as the digital value of the Addressable Latch 32 present on data paths $32_1$, $32_2$, $32_3$, $32_4$, $32_5$, $32_6$, $32_7$ and $32_8$, the inputs to each Exclusive OR Circuit $34_1$, $34_2$, $34_3$, $34_4$, $34_5$, $34_6$, $34_7$ and $34_8$ will be either: (1) a logic "1" from the Counter (2) 30 and a logic "0" from the Addressable Latch 32, or (2) a logic "0" from the Counter (2) 30 and a logic "1" from the Addressable Latch 32. These conditions will produce a logic "1" from each Exclusive OR Circuit $34_1$, $34_2$, $34_3$, $34_4$, $34_5$, $34_6$, $34_7$ and $34_8$, which will produce a logic "0" at the output of NAND Circuit 36.

It will, of course, be understood that the foregoing logic may be varied in accordance with the present invention. For example, it is possible for each of the common arms of the switches $S_1$, $S_2$, $S_3$, $S_4$, $S_5$, $S_6$, $S_7$ and $S_8$ of the modules 12, 14, 16, 18 to be connected to a voltage source $V_{DD}(1)$, which provides a voltage level representative of a logic "1". It would, of course, also be necessary to connect the resistor R to $V_{SS}(0)$. In such case, operation of the circuit arrangement previously described would proceed in substantially similar fashion. However, to achieve a correct output 56 from the eight input AND circuit 36 as previously described, Exclusive NOR Circuits would be substituted for Exclusive OR Circuits $34_1$, $34_2$, $34_3$, $34_4$, $34_5$, $34_6$, $34_7$ and $34_8$.

The output of the NAND Circuit 36 is routed to a two input NAND Circuit 40, which is in turn routed to the D input of a D-type Flip-Flop 42. The Q output of Flip-Flop 42 is the output signal 8 of the circuit arrangement of the present invention. The Flip-Flop 42 further includes a clock (CK) input which is coupled to the timing signal $\phi$ of the timing means 10, a reset (R) input which is coupled to the START signal output of the recloser control means 2, and a $\overline{Q}$ output which is routed to the second input of the AND circuit 38 and the second input of the NAND circuit 40.

Accordingly, it may be seen that the flow of information of the circuit arrangement of the present invention is of a prescribed sequential type established by the multiplexers 20, 22, 24, 26 and 28, operating in response to timing signals generated by the timing means 10 and in accordance with the status of the reclose cycle as indicated by the recloser control means 2 and Counter (1) 44. The developed information is transferred to a storage means, such as the Addressable Latch 32, also in response to timing signals generated by the timing means 10, whereupon these contents are compared by comparison means such as the Exclusive OR Circuits $34_1$, $34_2$, $34_3$, $34_4$, $34_5$, $34_6$, $34_7$ and $34_8$ to a digital counter means, such as the Counter (2) 30. In this manner, the circuit arrangement of the present invention generates an output signal 8 when any of the preselected limits established by the selectable means associated with multiplexers 20, 22, 24, 26 are reached. It will therefore be seen that the information flow of my circuit arrangement is of a synchronized nature which is essentially determined by the timing code signals A, B, C, D and $\phi$ developed by the timing means 10 and the control signals developed by the recloser control means 2. Reference is now made to FIG. 3, which shows an illustrative example of the timing code signals $\phi$, A, B, C and D, and to the following description regarding the manner in which the circuit arrangement of the present invention operates in response to these signals. FIG. 3 is segmented showing the timing signal $\phi$ in FIG. 3a; the timing signal A in FIG. 3b; the timing signal B in FIG. 3c; the timing signal C in FIG. 3d; and the timing signal D in FIG. 3e.

As previously described, the timing signals A, B and C of FIG. 3 are routed to the A, B and C inputs, respectively, of each of the multiplexers 20, 22, 24, 26, the recloser control means 2, and also to the A0, A1, and A2 inputs of the Addressable Latch 32. Thus, the timing signals A, B and C are used to synchronize the transmission of information between the multiplexers 20, 22, 24, 26, the recloser control means 2 and the Addressable Latch 32, via the multiplexer 28.

The inputs $X_0$, $X_1$, $X_2$, $X_3$, $X_4$, $X_5$, $X_6$ and $X_7$ to each of the multiplexers 20, 22, 24, 26 are developed in accordance with the condition of the switches $S_1$, $S_2$, $S_3$, $S_4$, $S_5$, $S_6$, $S_7$ and $S_8$ of the modules 12, 14, 16, 18. It will be understood that the switches $S_1$, $S_2$, $S_3$, $S_4$, $S_5$, $S_6$, $S_7$ and $S_8$ will be used to develop parallel formatted eight bit words representative of the selected limits associated with the reclose cycle. For example, in the present embodiment, module 12 is used to develop an eight bit word representative of the reset time which is deemed necessary to ensure that a successful reclose has occurred, which serves as the input to multiplexer 20 (MUX-1). Module 14 is used to develop an eight bit word representative of the intended delay which is to occur in conjunction with the second reclose of the recloser relay (first delayed reclose), which serves as the input to multiplexer 22 (MUX-2). Module 16 is used to develop an eight bit word representative of the intended delay which is to occur in conjunction with the third reclose of the reclose relay (second delayed reclose), which serves as the input to multiplexer 24 (MUX-3). Lastly, module 18 is used to develop an eight bit word representative of the intended delay which is to occur in conjunction with the fourth reclose of the recloser relay (third delayed reclose), which serves as the input to multiplexer 26 (MUX-4).

Each of the foregoing parallel formatted eight bit words are converted to serial eight bit words by the multiplexers 20, 22, 24, 26 in accordance with the timing signals A, B and C. It will therefore be understood that the serial eight bit words produced at the output X of each of the multiplexers 20, 22, 24, 26 will represent a selected time period which is developed in accordance with the repetition rate of the signals A, B and C produced by the timing means 10. Accordingly, the output X of MUX-1 will represent the reset time selected by the operator using the switches $S_1$, $S_2$, $S_3$, $S_4$, $S_5$, $S_6$, $S_7$ and $S_8$ of module 12; the output X of MUX-2 will represent the first delayed reclose selected by the operator using the switches $S_1$, $S_2$, $S_3$, $S_4$, $S_5$, $S_6$, $S_7$ and $S_8$ of module 14; the output X of MUX-3 will represent the second delayed reclose selected by the operator using the switches $S_1$, $S_2$, $S_3$, $S_4$, $S_5$, $S_6$, $S_7$ and $S_8$ of module 16; and the output X of MUX-4 will represent the third delayed reclose selected by the operator using the switches $S_1$, $S_2$, $S_3$, $S_4$, $S_5$, $S_6$, $S_7$ and $S_8$ of module 18.

When selected, the foregoing eight bit words will be read into Addressable Latch 32 at the same rate as they are received from the multiplexers 20, 22, 24, 26 since the Addressable Latch 32 and the multiplexers 20, 22, 24, 26 are commonly regulated by the timing signals A, B and C. Selection of the particular eight bit word which will be read into the Addressable Latch 32, for comparison with the Counter (2) 30, is determined by the multiplexer 28. The multiplexer 28 makes this determination in accordance with the condition of the recloser relay, as indicated by the recloser control means 2 via the Counter (1) 44.

This synchronized transfer of information via the multiplexer 28 to the Addressable Latch 32 is described in the following Table.

TABLE 1

| Information Transferred from Multiplexer 28 to Addressable Latch 32 | Output of Counter (1) | | |
|---|---|---|---|
| | $Q_1$ | $Q_2$ | $Q_3$ |
| MUX-1 (Reset) | 0 | 0 | 0 |
| MUX-2 (First Delayed Reclose) | 1 | 0 | 0 |
| MUX-3 (Second Delayed Reclose) | 0 | 1 | 0 |
| MUX-4 (Third Delayed Reclose) | 1 | 1 | 0 |
| MUX-1 (Reset) | 0 | 0 | 1 |

The outputs $Q_1$, $Q_2$ and $Q_3$ are shown in Table 1 as being either a "0" (a logic "0") representing the absence of a signal, or a "1" (a logic "1" ) representing the presence of a signal.

In operation, the Counter (1) 44 will have previously been reset to (000) by the RESET signal of the recloser control means 2. Accordingly, when a required reclose cycle is to commence, as will be more fully described below, the A and B inputs of MUX-5 (00) will cause selection of the X output of MUX-1 for introduction into the Addressable Latch 32. This will cause a count of the reset time selected, for use in conjunction with the first instantaneous reclose of the recloser relay.

An unsuccessful attempted reclose will cause the Counter (1) 44 to be incremented by the SEQ CNT output of the recloser control means 2, which will also increment the A and B inputs of MUX-5. This will cause the selection of the X output of MUX-2 for introduction into the Addressable Latch 32, causing a count of the delay time selected for use in conjunction with the second reclose (first delayed reclose) of the recloser relay.

As previously described, the recloser control means 2 also develops an OVERRIDE signal. When the OVERRIDE signal is not operational (at $V_{DD}(1)$), the AND circuits 48, 50 will route the $Q_1$ and $Q_2$ outputs of the Counter (1) 44 through to the multiplexer 28 as previously described. However, upon the initiation of an attempted reclose, the operational OVERRIDE signal (then at $V_{SS}(0)$) will cause the AND circuits 48, 50 to combine to inhibit the A, B inputs of MUX-5 (00), causing a further selection of the X output of MUX-1 upon the initiation of an attempted reclose. This will cause a further count of the reset time selected, for use in conjunction with the second reclose. Thereafter, the OVERRIDE signal will again be returned to $V_{DD}(1)$, returning the system to its original condition after a successful reclose or if the count of the reset time is interrupted by an unsuccessful reclose.

Another unsuccessful reclose will again cause the Counter (1) 44 to be incremented by the SEQ CNT signal, again incrementing the A and B inputs of MUX-5. This will cause the selection of the X output of MUX-3 for introduction into the Addressable Latch 32, causing a count of the delay time selected for use in conjunction with the third reclose (second delayed reclose) of the recloser relay. Again, upon initiation of the attempted reclose, the OVERRIDE signal will cause the AND circuits 48, 50 to produce a further count of the reset time selected, for use in conjunction with the third reclose. Thereafter, the OVERRIDE signal will again return the system to its original condition.

Another unsuccessful reclose will further increment the Counter (1) 44, causing MUX-5 to select the X output of MUX-4 for introduction into the Addressable Latch 32. This will cause a count of the delay time selected for use in conjunction with the fourth reclose (third delayed reclose) of the recloser relay. As previously, the OVERRIDE signal will again cause a count of the reset time selected, for use in conjunction with the fourth reclose.

Of course, if at any time in the reclose cycle a successful reclose is achieved, the RESET signal produced by the recloser control means 2 will reset the Counter (1) 44 (outputs to 000), preparing the Counter (1) 44 for subsequent operation, as needed. However, if the fourth attempted reclose is unsuccessful, the SEQ CNT signal produced by the recloser control means 2 will again increment the Counter (1) 44, producing the output shown at the last line of Table 1. In such case, a logic "1" will be provided at output $Q_3$ which will inhibit the clock (CK) input of the Counter (1) 44 via NOR circuit 46, and a logic "0" will be provided at outputs $Q_1$, $Q_2$ which will again cause MUX-5 to select the X output of MUX-1. Since, after four unsuccessful attempted reclosures, the recloser relay will assume a "lockout" condition, this will provide a final count of the reset period when a manual close of the circuit breaker is attempted. Subsequently, upon establishing a successful manual reclosure, the recloser control means 2 will produce a RESET signal for delivery to the Counter (1) 44, resetting the Counter (1) 44 for subsequent operations, as needed.

Regarding the foregoing discussion, reference is made to FIG. 4, which provides a matrix summarizing the various operational conditions previously described. Illustrated are the various inputs and outputs of the Counter (1) 44 and multiplexer 28 (MUX-5) previously described, as well as the various signals which are used to process the desired information as previously discussed. The symbol X which is used in FIG. 4 represents a "DON'T CARE" logic condition.

The timing signal D of FIG. 3 is used to establish the basic timing function of the recloser relay, as developed by the Counter (2) 30, and is routed to AND circuit 38 for a purpose which will be more fully described below. As previously discussed, the repetition rate of the signal D is much lower than the repetition rates of the signals A, B and C. Although this is not readily apparent from FIG. 3, it is to be understood that this is because the illustration of FIG. 3 does not show the return or positive edge of the waveform to a logic "1". Since the repetition rate of the signal D is preferably either 1 or 10 Hz, this will develop a basic count of either one second or one tenth of one second, respectively.

The timing signal $\phi$ of FIG. 3 is routed to the WRITE DISABLE input of the Addressable Latch 32 and to the clock (CK) input of Flip-Flop 42. Applying the signal $\phi$ (at $V_{DD}(1)$) to the WRITE DISABLE of the Addressable Latch 32 will prevent the information which has been entered in the Addressable Latch 32 from being applied to the outputs Q0, Q1, Q2, Q3, Q4, Q5, Q6 or Q7. When the signal $\phi$ is at $V_{SS}(0)$, the information entered in the Addressable Latch 32 will be applied to the outputs Q0, Q1, Q2, Q3, Q4, Q5, Q6 or Q7 in accordance with the input codes A0, A1 and A2 for comparison with the Counter (2) 30 as previously described. To avoid the occurrence of timing problems, commonly known as "races", when information is being stored within the Addressable Latch 32 for comparison with the information developed within the Counter (2) 30, it is preferred that transitions in the signals A, B, C and D occur when the signal $\phi$ is at $V_{DD}(1)$ and the Addressable Latch 32 is disabled (within the time frame "E" illustrated in FIG. 3).

Further in this regard, the signal $\phi$ is applied to the clock (CK) input of the Flip-Flop 42 to route the information of the input D of the Flip-Flop 42 through to the Q output of Flip-Flop 42. When a selected time period (reclose or reset) is to commence, a START signal is produced by the recloser control means 2 and is applied to the reset (R) input of the Counter (2) 30, resetting the Counter (2) 30 to its initial condition. The presence of the START signal is also used to reset the Flip-Flop 42, producing a $V_{SS}(0)$ (logic "0") at the Q output of the Flip-Flop 42, and a $V_{DD}(1)$ (logic "1") at the $\overline{Q}$ output of the Flip-Flop 42. As a result, since the Q output of Flip-Flop 42 represents the Output 8 of the circuit arrangement of the present invention, the circuit output will be $V_{SS}(0)$ (a logic "0"). Further, since the output of NAND circuit 36 is ordinarily at $V_{DD}(1)$ and is routed to the first input of NAND circuit 40, and since the $\overline{Q}$ output of Flip-Flop 42 is routed to the second input of NAND circuit 40, a $V_{SS}(0)$ will be produced at the output of NAND circuit 40 which will in turn be routed to the D input of the Flip-Flop 42. Still further, since the $\overline{Q}$ output of the Flip-Flop 42 is routed to the input of AND circuit 38, the signal D will be routed through the AND circuit 38 to the clock (CK) input of the Counter (2) 30, incrementing the Counter (2) 30.

This condition will continue, incrementing the Counter (2) 30 in accordance with the signal D, until the contents of the Counter (2) 30 equal the contents of the Addressable Latch 32. At that time, the output of NAND circuit 36 will change to $V_{SS}(0)$ which will cause the output of NAND circuit 40 to change to $V_{DD}(1)$, whereupon the signal $\phi$ will clock the Flip-Flop 42. As a result, the Q output of the Flip-Flop 42, and accordingly, the Output 8 of the circuit arrangement of the present invention, will be changed to $V_{DD}(1)$ (a logic "1"). The $\overline{Q}$ output of the Flip-Flop 42 will be changed to $V_{SS}(0)$ which will maintain the output of the NAND circuit 40 at $V_{DD}(1)$, maintaining the Q output of the Flip-Flop 42 at $V_{DD}(1)$ until the Flip-Flop 42 is reset, and will change the output of the AND circuit 38 to $V_{SS}(0)$, preventing further clocking of the Counter (2) 30.

The Output signal 8 previously described is routed to the recloser control means 2 as its timing input signal. The recloser control means 2 also monitors the breaker auxiliary contact Y and the breaker control switch Z. For timed reclosures, the Output signal 8 is used to produce a reclose signal for the circuit breaker, and is also used to provide the START signal. The START signal is also dependent upon the condition of the breaker auxiliary contact Y and the breaker control switch Z. The Output signal 8 is also used to develop the RESET signal after the reset time has been completed.

It should therefore be appreciated that my controller for a recloser relay provides supervisory means for monitoring and supervising the reclosing of a fault response circuit breaker.

Further, it should be appreciated that the desired limits for the controlling of the fault responsive circuit breaker are easily selectable so as to easily adapt the fault responsive circuit breaker to various fault conditions that may occur.

Still further, it should be appreciated that my controller for a recloser relay utilizes a sequential and synchronous data flow which provides the desired operation while minimizing the amount of electronic devices required to do so.

While the principles of the invention have now been made clear in an illustrative embodiment, there will be immediately obvious to those skilled in the art, many modifications of structure, arrangement, the elements, material, and components used in the practice of the invention and otherwise, which are particularly adapted for specific environments and operation requirements without departing from those principles. The appended claims are, therefore, intended to cover and embrace any such modifications within the limits only of the true spirit and scope of the invention.

What I claim is:

1. For a recloser relay means, a controller means comprising:
    (a) a plurality of selectable means for developing a plurality of signals representative of selected timing characteristics for operation of the recloser relay means;
    (b) first counter means, operatively associated with the recloser relay means, for developing a signal responsive to the condition of the recloser relay means;
    (c) sequential means, operatively associated with the plurality of selectable means and the first counter means, for accepting the signals developed by the plurality of selectable means and for developing an output signal selected from between the plurality of signals received from the selectable means in accordance with the signal received from the first counter means; and
    (d) means for comparing the output signal of the sequential means with an output signal of a second counter means to develop a control signal for use in connection with the recloser relay means.

2. The controller means of claim 1 wherein each of the selectable means comprise a series of switches commonly connected to a voltage representative of a selected logic condition.

3. The controller means of claim 1 wherein the selectable means each develop an eight bit, parallel formatted digital signal.

4. The controller means of claim 3 wherein the sequential means converts the eight bit, parallel formatted digital signals to eight bit serial digital signals.

5. The controller means of claim 4 wherein the sequential means comprises a plurality of multiplexer means, wherein one multiplexer means is associated with each of the plurality of selectable means, and wherein the outputs of each of the multiplexer means are regulated by a common timing signal.

6. The controller means of claim 5 wherein an additional multiplexer means receives the outputs of each of the multiplexer means associated with the selectable means, which additional multiplexer means selects between the outputs developed by the plurality of multiplexer means associated with the selectable means in accordance with the signal received from the first counter means.

7. The controller means of claim 1 wherein the first counter means comprises:

(a) a counter operatively associated with the recloser relay means, and responsive to a first signal received from the recloser relay means;

(b) gating means operatively associated with the counter and with the recloser relay means, and responsive to a second signal received from the recloser relay means;

(c) wherein the gating means develops the signal which regulates the output of the sequential means.

8. The controller means of claim 7 wherein the first signal from the recloser relay means indicates which of a plurality of reclosures of the recloser relay means is to be performed, and wherein the second signal from the recloser relay means indicates the initiation of each performed reclosure.

9. The controller means of claim 8 wherein the gating means causes the second signal to override the first signal.

10. The controller means of claim 9 wherein the override causes the sequential means to select the timing characteristic developed by one of the selectable means.

11. The controller means of claim 10 wherein said one selectable means develops a timing characteristic representative of a desired reset time for the recloser relay means, and wherein the remaining selectable means develop timing characteristics representative of desired time delays for attempted recloses of the recloser relay means.

12. The controller means of claim 1 wherein the comparing means comprises:

(a) storage means operatively associated with the sequential means, for storing the selected output signal of the sequential means;

(b) second counter means for developing a counted output signal representative of time; and (c) comparison means for comparing the selected output signal stored in the storage means with the counted output signal of the second counter means.

13. The controller means of claim 12 wherein the storage means is an addressable latch.

14. The controller means of claim 12 wherein the storage of data within the storage means is accomplished in response to a timing signal, and wherein the timing signal also regulates the development of the output signal of the sequential means in accordance with the plurality of signals developed by the plurality of selectable means.

15. The controller means of claim 12 further comprising switching means operatively associated with the comparing means, for receiving an output signal from the comparing means and for developing an output signal for regulating the operation of the recloser relay means.

16. The controller means of claim 15 wherein the output signal of the comparing means is produced when the comparison means indicates that the counted output signal of the second counter means corresponds to the selected output signal stored in the storage means.

17. The controller means of claim 15 wherein the output signal for regulating the operation of the recloser relay means is presented after the output signal of the comparing means is produced, and remains present until another timing characteristic is to be developed.

* * * * *